United States Patent
DiFrancesco (10) Patent No.: US 9,888,370 B2
(45) Date of Patent: Feb. 6, 2018

(54) RELAY DEVICE, METHOD AND COMPUTER PROGRAM

(71) Applicants: SONY CORPORATION, Tokyo (JP); SONY EUROPE LIMITED, Weybridge (GB)

(72) Inventor: Renaud DiFrancesco, London (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 14/441,256

(22) PCT Filed: Jan. 30, 2014

(86) PCT No.: PCT/GB2014/050244
§ 371 (c)(1),
(2) Date: May 7, 2015

(87) PCT Pub. No.: WO2014/132027
PCT Pub. Date: Sep. 4, 2014

(65) Prior Publication Data
US 2015/0373518 A1    Dec. 24, 2015

(30) Foreign Application Priority Data

Feb. 27, 2013    (GB) .................. 1303463.2

(51) Int. Cl.
*H04W 4/22* (2009.01)
*H04H 20/59* (2008.01)
(Continued)

(52) U.S. Cl.
CPC .......... *H04W 4/22* (2013.01); *H04B 7/15592* (2013.01); *H04H 20/02* (2013.01);
(Continued)

(58) Field of Classification Search
CPC ....... H04W 4/22; H04W 76/007; H04W 4/06; H04W 4/14; H04W 48/10; H04H 20/59;
(Continued)

(56) References Cited

U.S. PATENT DOCUMENTS 6,625,119 B1 *  9/2003  Schuster ............... H04M 3/365
                                                                370/230
6,745,021 B1 *  6/2004  Stevens ................... H04M 3/42
                                                                455/404.1
(Continued)

FOREIGN PATENT DOCUMENTS

CN    101340248 A    1/2009
CN    102412921 A    4/2012
(Continued)

OTHER PUBLICATIONS

International Search Report dated Apr. 1, 2014 in PCT/GB2014/050244 filed Jan. 30, 2014.
(Continued)

Primary Examiner — Matthew Sams
(74) Attorney, Agent, or Firm — Oblon, McClelland, Maier & Neustadt, L.L.P.

(57) ABSTRACT

A relay device operable to relay emergency information to a plurality of mobile terminals. The device includes: a receiver configured in use to receive a broadcast signal, the broadcast signal being in a first format and containing the emergency information; a transmitter configured in use to connect to the plurality of mobile terminals using a communication channel; and a processor configured in use to provide the emergency information received in the broadcast signal to the plurality of mobile terminals in a second format using the transmitter, wherein the second format is different to the first format.

22 Claims, 9 Drawing Sheets

(51) Int. Cl.
- *H04H 60/88* (2008.01)
- *H04H 20/02* (2008.01)
- *H04B 7/155* (2006.01)
- *H04L 29/12* (2006.01)
- *H04W 4/14* (2009.01)
- *H04W 72/00* (2009.01)
- *H04W 76/00* (2009.01)

(52) U.S. Cl.
CPC ............ *H04H 20/59* (2013.01); *H04H 60/88* (2013.01); *H04L 61/2007* (2013.01); *H04W 4/14* (2013.01); *H04W 72/005* (2013.01); *H04W 76/007* (2013.01); *H04H 2201/37* (2013.01)

(58) Field of Classification Search
CPC ........ H04H 20/42; H04H 20/02; H04H 20/22; H04B 7/15592; H04M 1/72536; H04M 2203/205
See application file for complete search history.

(56) References Cited

U.S. PATENT DOCUMENTS

| | | | | |
|---|---|---|---|---|
| 9,148,676 | B2* | 9/2015 | Fay | H04N 21/2385 |
| 2003/0078029 | A1* | 4/2003 | Petite | H04M 11/04 |
| | | | | 455/404.1 |
| 2003/0186721 | A1* | 10/2003 | Kanazawa | H04W 88/06 |
| | | | | 455/552.1 |
| 2004/0203562 | A1 | 10/2004 | Kolsrud | |
| 2005/0272412 | A1* | 12/2005 | Langsenkamp | H04L 12/189 |
| | | | | 455/414.2 |
| 2007/0167162 | A1* | 7/2007 | Kim | H04M 1/6066 |
| | | | | 455/435.1 |
| 2008/0016556 | A1* | 1/2008 | Selignan | H04W 4/22 |
| | | | | 726/7 |
| 2008/0034114 | A1* | 2/2008 | Ducey | H04H 20/24 |
| | | | | 709/238 |
| 2008/0209361 | A1* | 8/2008 | Nickerson | G06F 17/3089 |
| | | | | 715/808 |
| 2008/0209466 | A1* | 8/2008 | Ishida | H04H 20/103 |
| | | | | 725/33 |
| 2009/0170467 | A1* | 7/2009 | Nowlan | H04W 4/22 |
| | | | | 455/404.1 |
| 2009/0187953 | A1* | 7/2009 | Onoe | H04N 7/165 |
| | | | | 725/105 |
| 2010/0081381 | A1* | 4/2010 | Rofougaran | H04B 7/12 |
| | | | | 455/41.2 |
| 2010/0173603 | A1* | 7/2010 | Kwak | B60W 30/0956 |
| | | | | 455/404.1 |
| 2010/0297931 | A1* | 11/2010 | Ueno | G08B 27/008 |
| | | | | 455/3.01 |
| 2010/0317317 | A1 | 12/2010 | Maier et al. | |
| 2010/0322144 | A1* | 12/2010 | Lee | H04B 7/155 |
| | | | | 370/315 |
| 2011/0063105 | A1 | 3/2011 | Bennett et al. | |
| 2011/0088058 | A1 | 4/2011 | Velazquez et al. | |
| 2011/0140882 | A1* | 6/2011 | Jang | G08B 25/009 |
| | | | | 340/539.13 |
| 2011/0151829 | A1 | 6/2011 | Velusamy et al. | |
| 2012/0040636 | A1* | 2/2012 | Kazmi | H04W 4/22 |
| | | | | 455/404.2 |
| 2013/0237148 | A1* | 9/2013 | McCann | H04W 4/008 |
| | | | | 455/41.1 |
| 2013/0281045 | A1* | 10/2013 | Daly | H04W 4/02 |
| | | | | 455/404.1 |
| 2013/0331053 | A1* | 12/2013 | Vick | H04W 4/22 |
| | | | | 455/404.1 |
| 2014/0111687 | A1 | 4/2014 | Difrancesco et al. | |
| 2014/0157304 | A1* | 6/2014 | Fay | H04N 21/2385 |
| | | | | 725/32 |
| 2014/0162582 | A1* | 6/2014 | Daly | H04W 76/007 |
| | | | | 455/404.1 |
| 2015/0140924 | A1* | 5/2015 | Marathe | H04H 20/59 |
| | | | | 455/3.01 |
| 2015/0373518 | A1* | 12/2015 | Difrancesco | H04H 20/02 |
| | | | | 455/404.1 |

FOREIGN PATENT DOCUMENTS

| | | | | |
|---|---|---|---|---|
| CN | 102868469 A | 1/2013 | | |
| EP | 2222070 A1 | 8/2010 | | |
| JP | 2008-011061 A | 1/2008 | | |
| WO | WO 2011091850 A1 * | 8/2011 | ........... | H04L 1/0065 |

OTHER PUBLICATIONS

Office Action dated May 2, 2017 in Chinese Patent Application No. 2014800099284 (generated in English).

Office Action dated Aug. 30, 2017 in Chinese Patent Application No. 2014800099284 (in English).

* cited by examiner

RELAY DEVICE, METHOD AND COMPUTER PROGRAM

BACKGROUND

Field of the Disclosure

The present invention relates to a relay device, method and computer program.

Description of the Related Art

The "background" description provided herein is for the purpose of generally presenting the context of the disclosure. Work of the presently named inventor, to the extent it is described in the background section, as well as aspects of the description which may not otherwise qualify as prior art at the time of filing, are neither expressly or impliedly admitted as prior art against the present invention.

In the event of an emergency situation, such as a natural disaster, it is usual for cellular networks to become overloaded due to people trying to use their cellular phones. This makes it very difficult for people to be updated of rapidly changing developments and thus may increase the risk to individuals. This is also applicable in the event of a security incident. Emergency authorities may request that service providers prevent certain types of communication, or temporarily cease operating parts of their network, yet at the same time provide appropriate information to the public. It is an aim of the following to address this.

SUMMARY

According to a first aspect, there is provided a relay device operable to relay emergency information to a plurality of mobile terminals, the device comprising: a receiver configured in use to receive a broadcast signal, the broadcast signal being in a first format and containing the emergency information; a transmitter configured in use to connect to the plurality of mobile terminals using a communication channel; and a processor configured in use to provide the emergency information received in the broadcast signal to the plurality of mobile terminals in a second format using the transmitter, wherein the second format is different to the first format.

The communication channel may be unencrypted.

The receiver may be configured to receive an emergency flag carried in the broadcast signal, whereby in response to the emergency flag, the transmitter is configured to broadcast a predetermined identifier, carried in the broadcast signal, which identifies the relay device to the plurality of mobile terminals.

The emergency information may contain the text of a webpage to be displayed on the plurality of mobile terminals, and the processor is configured to convert the received text into the webpage to be displayed on the plurality of mobile terminals.

The receiver may be configured to receive a feedback flag located in the broadcast signal, whereby in response to the feedback flag, the processor is configured to include a feedback element within the webpage.

The relay device may further comprise a network connection operable to connect the relay device to a network, wherein the emergency information contains a unique resource identifier of the webpage to be displayed to the plurality of mobile terminals and the network connection is operable to provide the webpage at the unique resource identifier to the plurality of mobile terminals.

A mobile terminal comprising: a first receiver operable to connect to the relay device of the above over the communication channel and to receive the emergency information in the second format is also provided.

The mobile terminal may further comprise a second receiver operable to connect to a cellular network, wherein prior to connection of the first receiver to the relay device above, the second receiver is operable to receive a message over the cellular network, the message being sent using Short Message Service-Cell Broadcast.

There is also provided a relay device according to the above configured in use to connect to the mobile terminal of the above via WiFi.

According to another embodiment there is provided a method of relaying emergency information to a plurality of mobile terminals, the method comprising: receiving a broadcast signal, the broadcast signal being in a first format and containing the emergency information; connecting to the plurality of mobile terminals using a communication channel; and providing the emergency information received in the broadcast signal to the plurality of mobile terminals in a second format using the transmitter, wherein the second format is different to the first format.

The communication channel may be unencrypted.

The method may comprise receiving an emergency flag carried in the broadcast signal, whereby in response to the emergency flag, the method comprises broadcasting a predetermined identifier, carried in the broadcast signal, which identifies the relay device to the plurality of mobile terminals.

The emergency information may contain the text of a webpage to be displayed on the plurality of mobile terminals, and the method comprises converting the received text into the webpage to be displayed on the plurality of mobile terminals.

The method may comprise receiving a feedback flag located in the broadcast signal, whereby in response to the feedback flag, the method comprises including a feedback element within the webpage.

The method may comprise connecting the relay device to a network, wherein the emergency information contains a unique resource identifier of the webpage to be displayed to the plurality of mobile terminals and providing the webpage at the unique resource identifier to the plurality of mobile terminals.

A computer program comprising computer readable instructions which, when loaded onto a computer, configure the computer to perform the method of the above is provided.

A storage medium configured to store the computer program of the above therein or thereon is provided.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views.

Figure 1:
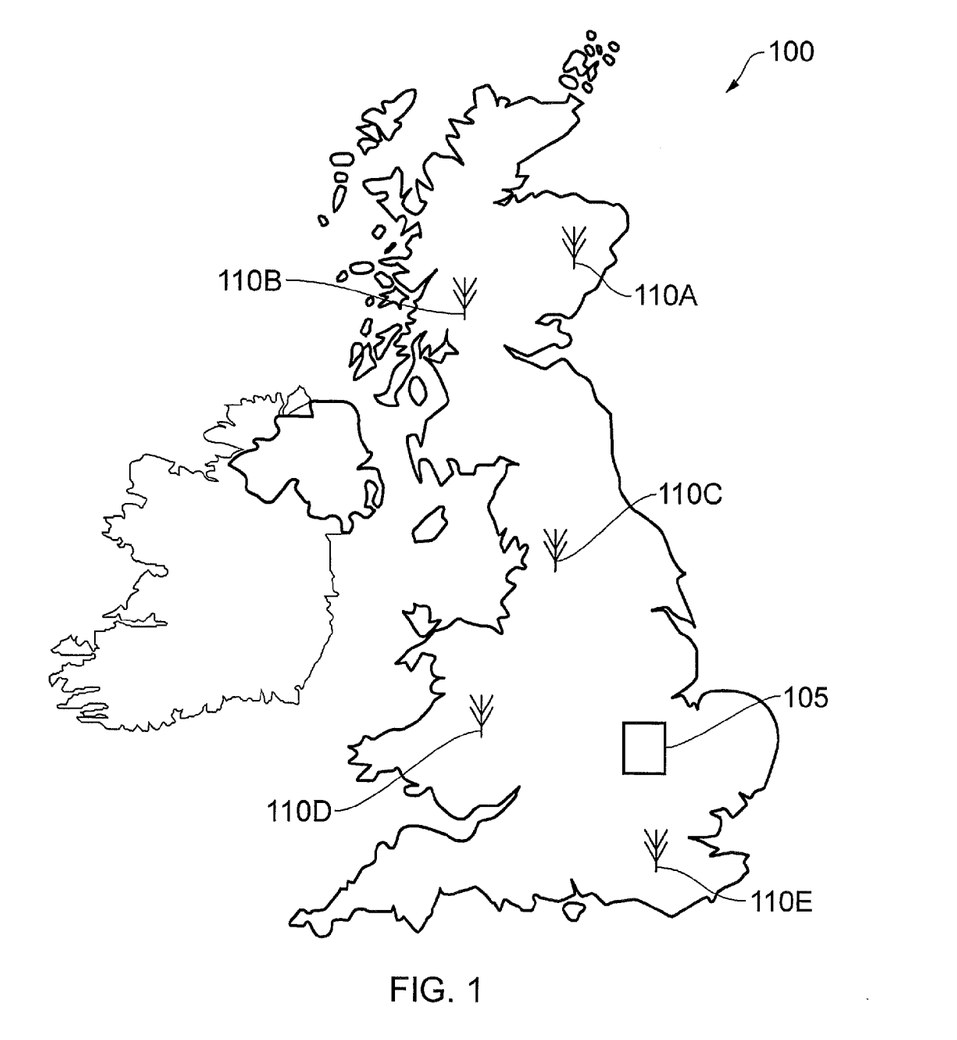
FIG. 1 shows a map of the United Kingdom with representative broadcast stations.

Referring to FIG. 1, a map of the United Kingdom including a representation of broadcast stations 110A-110E is shown. The broadcast stations 110A-110E receive information from a central controller 105. The central controller 105 provides broadcast programming to be transmitted by the broadcast stations 110A-110E.

As a non-limiting example, the broadcast stations 110A-110E may broadcast digital terrestrial television, such as streams complying with the Digital Video Broadcast-Terrestrial (DVB-T) and DVB-T2 and DVB-T2lite standards, the Integrated Services Digital Broadcasting (ISDB) standard or the like. However, the broadcast stations 110A-110E may transmit signals and streams complying to other standards such as digital audio signals complying with Digital Audio Broadcast (DAB), digital television for mobile devices (DVB-H, DVB-NGH, ATSC M/H or ISDB-1seg) or the like. For convenience, the following will be described with the broadcast stations 110A-110E transmitting using the DVB-T2 standard.

As the skilled person will appreciate, the broadcast stations 110A-110E are typically located on high ground to ensure that the coverage of the broadcast station 110A-110E is uninterrupted. In other words, the position of broadcast stations 110A-110E is usually high to avoid hills or mountains blocking the broadcast signal. This allows a typical broadcast station 110A-110E to have a range of 150-200 km Given that broadcast stations 110A-110E cover such a large area, containing a large number of receiving devices, the infrastructure associated with the broadcast station 110A-110E is typically very robust. For example, the power supply to the broadcast stations 110A-110E is secure. This means that in the event of an emergency such as a tsunami or other natural disaster or terrorist attack, the broadcast stations 110A-110E are likely to remain unaffected and will continue broadcasting. In embodiments, DVB-T2 is used for broadcasting the broadcast signal. DVB-T2 signals are created using some advanced forward error correction and other modulation techniques making it particularly robust. Some operating modes of DVB-T2 may be selected as offering levels of robustness over other operating modes.

Figure 2:
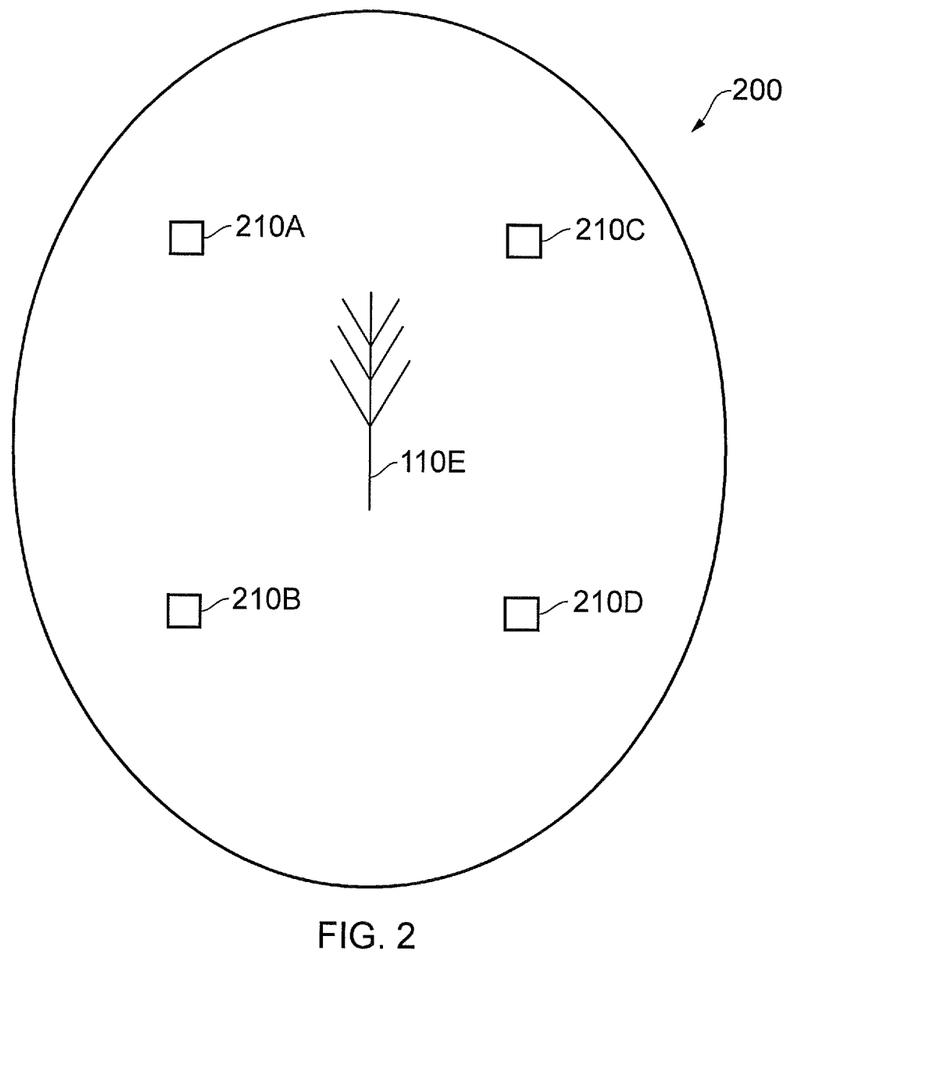
FIG. 2 shows a broadcast region covered by one of the broadcast stations, the broadcast region including representative relay devices according to the disclosure.

Referring to FIG. 2, a typical cell 200 of coverage provided by one of the broadcast stations 110E is shown. Additionally shown in the cell 200 is a plurality of representative relaying (or routing) devices 210A-210D according to the disclosure. Of course, other devices such as televisions compatible with the DVB-T2 standard will also be present in the cell 200 but are not shown. These relaying devices 210A-210D each contain a DVB-T2 receiver as will be explained later. The DVB-T2 receiver is configured to receive and decode the DVB-T2 signal transmitted by the broadcast stations 110A-110E. A non-limiting example of a DVB-T2 receiver incorporates the CXD2820R demodulator chip made by Sony®.

The DVB-T2 receiver located within the relaying devices 210A-210E receives and decodes the DVB-T2 signalling and data packets. As will be explained later, in the event of an emergency, the central controller 105 inserts emergency information and, optionally, an emergency flag into the DVB-T2 stream to be broadcast by the broadcast stations 110A-110E. In example embodiments, the emergency information, and optional emergency flag is inserted within a Future Extension Frame part of the DVB-T2 Super-Frame. Of course, the emergency information and emergency flag could be located anywhere within the DVB-T2 stream. Moreover, the emergency information and emergency flag could be located at an appropriate location within any other formatted stream such as within the service information in a DVB transport stream (i.e. within the DVB-SI, Service Information). As will be apparent, the emergency information is information that the emergency services wish for people within the cell 200 of the broadcast station 110E to receive or to view. Additionally, the optional emergency flag indicates to the relaying device 210A-210E that the relaying device 210A-210E should operate in an emergency mode. It is envisaged, that the emergency flag is only optional and the relaying device 210A-210E may operate in the emergency mode by the presence of the emergency information alone. In other words, as the DVB-T2 signal includes emergency information, the relaying device 210A-210E may automatically enter the emergency mode. When in non-emergency mode, the relaying devices 210A-210E may operate, in a non-limiting example, as a WiFi hotspot allowing users to connect to the internet or other wide area network.

Figure 3:
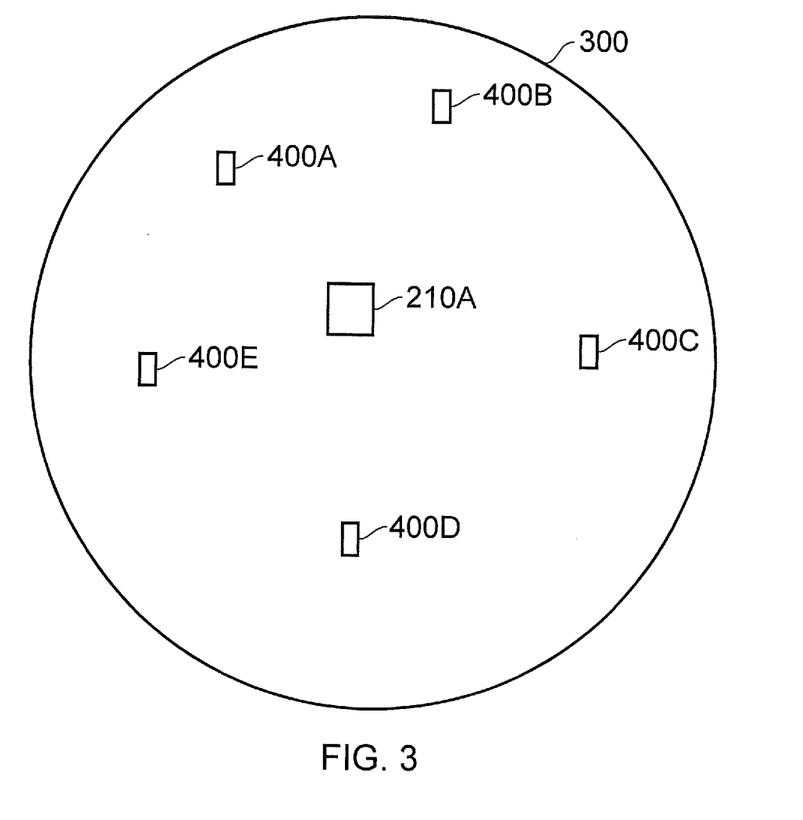
FIG. 3 shows a cell covered by one of the relay devices of FIG. 2, the cell including representative mobile terminals according to the disclosure.

Referring to FIG. 3, when entering the emergency mode, the relaying device 210A-210E communicates with one or more mobile terminals, such as a cellular telephone, tablet computer, laptop computer or the like. In particular, in FIG. 3, a relaying device 210A communicates with a plurality of mobile terminals 400A-400E using a communication standard different to that of the broadcast station 110E. In other words, although the relaying device 210A receives the emergency flag and the emergency information using a broadcast standard such as the DVB-T2 standard, the relaying device 210A communicates with the mobile terminals 400A-400E using a different standard. For example, the relaying device 210A may communicate with the mobile terminals using WiFi or any kind of communication protocol, such as WiMax, Bluetooth, NFC (Near Field Communications) or the like. In the following example, the relaying device 210A communicates with the mobile terminals using WiFi.

Figure 4:
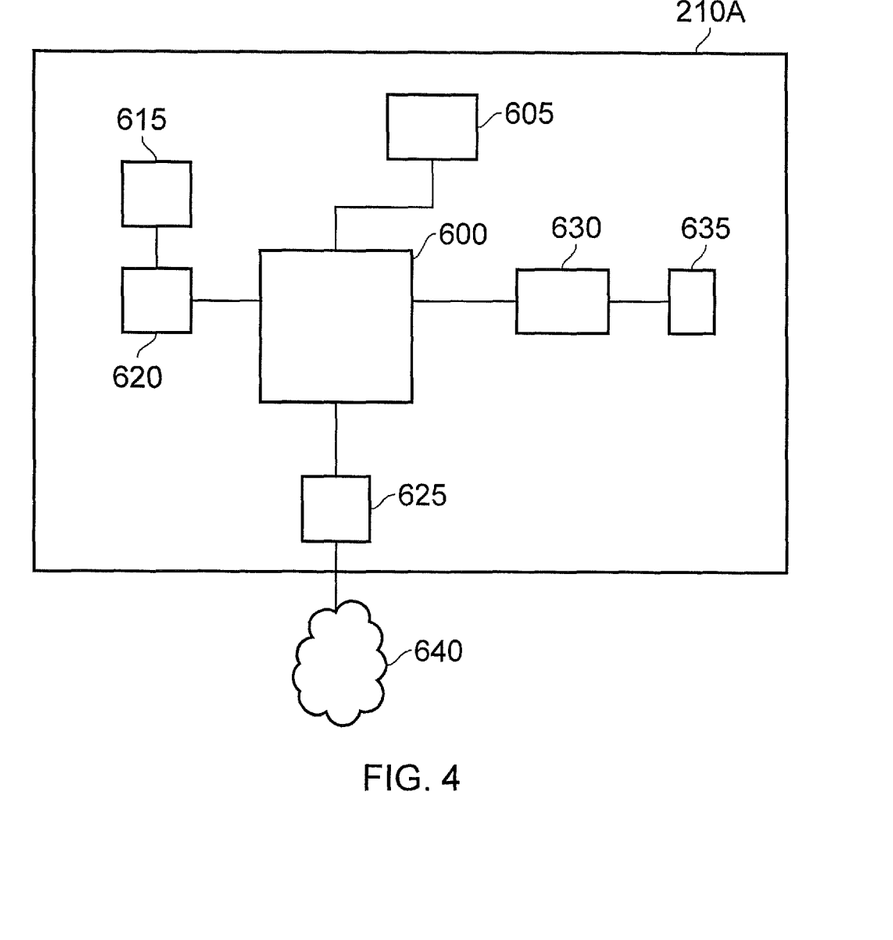
FIG. 4 shows a block diagram of a relay device of FIG. 3.

Referring to FIG. 4, a relaying device 210A shown in FIG. 3 contains a first processor 600. The first processor 600 is controlled using a computer program. The computer program contains computer readable instructions which configure the first processor 600 to operate in a particular manner as will be explained later. The computer program that controls the first processor 600 is stored on a computer readable storage medium. The computer storage medium is provided in the relaying device 210A as memory 605. In particular, the memory 605 is a solid state memory. However, the disclosure is not so limited and may be any kind of memory such as an optically readable memory or the like. The computer readable storage medium may be located outside of the relaying device 210A for example, in a server or on the Internet or the like.

Additionally connected to the first processor 600 is, in this case, a DVB-T2 receiver 630. However, it is envisaged that the DVB-T2 receiver 630 would be appropriately chosen to receive the signals transmitted by the broadcast station 110E. The DVB-T2 receiver 630 receives the signals using a DVB-T2 antenna 635 also connected to the DVB-T2 receiver 630. The DVB-T2 receiver 630 also decodes the signals transmitted by the broadcast station 110E and passes the resultant data stream to the first processor 600.

Additionally connected to the first processor 600 is, in this case, a WiFi transceiver 620. This is because the mobile terminal 400A communicate with the relaying device 210A using WiFi. However, it is envisaged that the WiFi transceiver 620 would be appropriately chosen to transmit and receive signals with the mobile terminal 400A with which the relaying device 210A communicates. A non-limiting example WiFi transceiver chip is the STLC4420 by STMicroelectronics®. The WiFi transceiver 620 is also connected to a WiFi antenna 615 from which the WiFi signals are transmitted. The WiFi antenna 615 may be a Multiple-Input-Multiple-Output (MIMO) type antenna or the like.

Additionally connected to the first processor 600 is a network connector 625. The network connector 625 connects the relaying device 210A to a wide or local area network 640. For example, the network connector 625 may be an Ethernet connector or the like that connects the relaying device 210A to the Internet or a Local Area Network.

Figure 5:
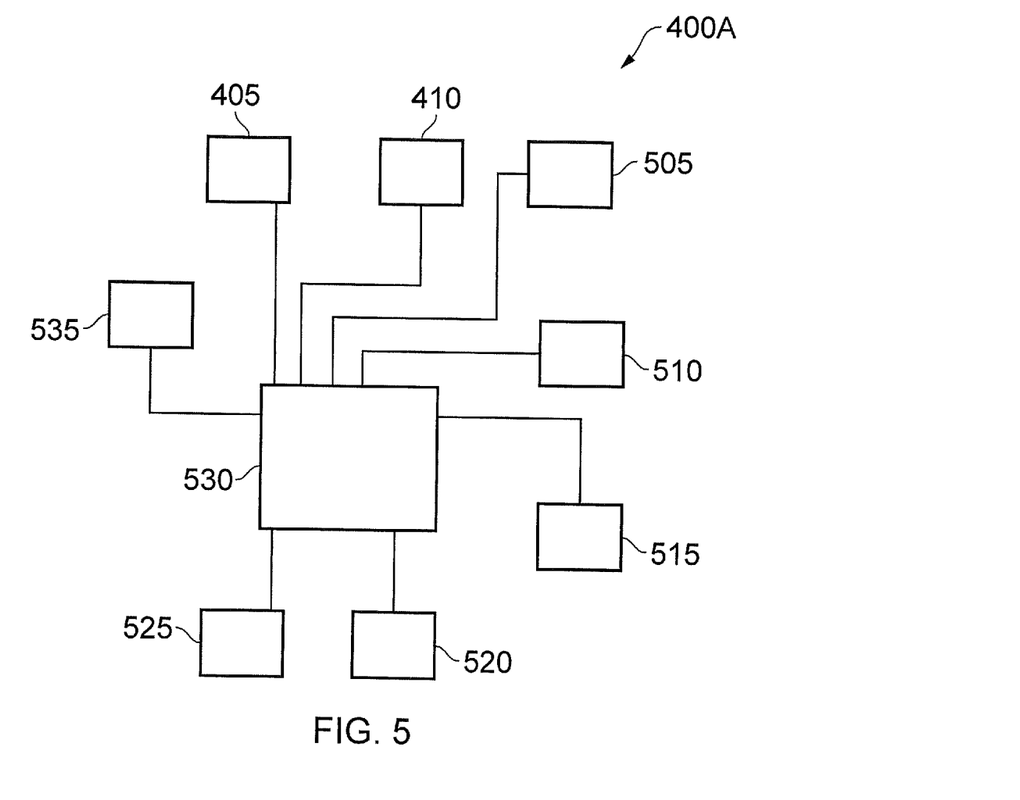
FIG. 5 shows a block diagram of a mobile terminal of FIG. 3.

Referring to FIG. 5 which shows a mobile terminal 400A of the disclosure, a second processor 530 is provided. The second processor 530 is controlled using a computer program. The computer program contains computer readable instructions which configure the second processor 530 to operate in a particular manner as will be explained later. The computer program that controls the second processor 530 is stored on a computer readable storage medium. The computer storage medium is provided in the relaying device 400A as memory 525. In particular, the memory 525 is a solid state memory. However, the disclosure is not so limited and may be any kind of memory such as an optically readable memory or the like. The computer readable storage medium may be located outside of the mobile terminal 400A for example, in a server or on the Internet or the like.

Additionally connected to the second processor 530 is a speaker 405. The speaker 405 is provided so that the user of the mobile terminal 400A may listen to a telephone call or audio content such as music or the like. A camera 410 is also connected to the second processor 530. The camera 410 is used to capture images using the mobile terminal 400A. The camera 410 may be used to capture images of the emergency situation and sent to the emergency services. Further, the captured images may be attached to a Multi-Media Service (MMS) message or stored in the memory 525.

The second processor 530 is also connected to a display 505. The display 505 may be a high definition Organic Light Emitting Diode type display or the like. In a non-limiting example, the display 505 is a touch-screen display that provides a user interface with the mobile terminal 400A. The second processor 530 is also connected to a WiFi transceiver 510 (such as the STLC4550 by STMicroelectronics®). The WiFi transceiver 510 enables the mobile terminal 400A to communicate with the relaying device 210A using WiFi.

A cellular network transceiver 525 is also connected to the second processor 530. The cellular network transceiver 525 enables the mobile terminal 400A to communicate with 3G or LTE cellular network. The cellular network transceiver 525 enables the mobile terminal 400A to send and receive telephone calls and send and receive both SMS and MMS messages.

Additionally connected to the second processor 530 is a microphone 520. The microphone 530 enables the user to make telephone calls and/or issue voice commands to the mobile terminal 400A. A near field communication (NFC) transceiver 535 is connected to the second processor 530. The NFC transceiver 535 enables the mobile terminal 400A to receive high bandwidth data over a very short distance and may be used to enable the mobile terminal 400A to operate as an electronic wallet.

Figure 6:
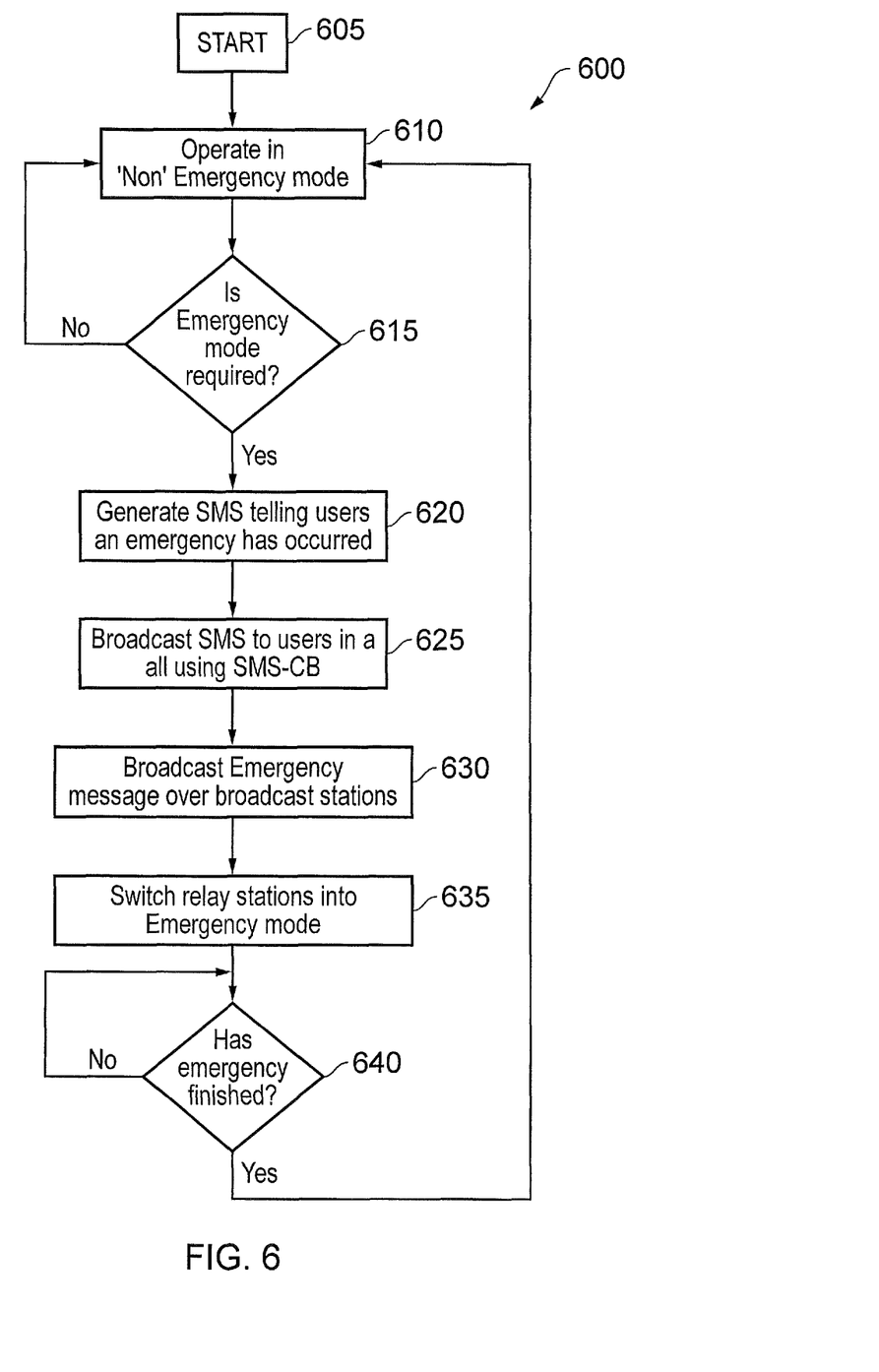
FIG. 6 shows a flow diagram explaining the operation of the broadcast station of FIG. 2.

FIG. 6 shows a flow chart 600 describing the operation of a system according to an example embodiment the disclosure. The broadcast station 110E starts operating at 605. In a non-emergency situation, the broadcast station 110E transmits the DVB-T2 data packets. These packets typically contain television programs (video data in the form of transport streams) During the non-emergency operation mode, one or more Future Extension Frame of the DVB-T2 super frame does not include the emergency flag nor does the Future Extension Frame of the DVB-T2 super frame include the emergency information. As the Future Extension Frame of the DVB-T2 super frame does not include the emergency flag or emergency information, the DVB-T2 receiver 630 of the relaying device 210A simply ignores the received packets and continues to operate as a WiFi hotspot.

The relaying device 210A decides whether operation in emergency mode is required in decision 615. In order to decide whether operation in emergency mode is required, the first processor 200 determines whether an emergency flag or emergency information is included in one or more Future Extension Frame of the DVB-T2 super frame. By providing the emergency flag, the first processor 200 only needs to review the Future Extension Frame for a flag which is smaller than the emergency information. This can make the decision step 615 quicker and requiring less processing if an emergency flag is present in the Future Extension Frame rather than the first processor 200 having to process all emergency information.

If operation in emergency mode is not required, the process returns to step 610. However, if there is an emergency, such as a natural disaster in a particular location, operation in emergency mode is required. The emergency services provide information to the central controller 105 defining the location of the natural disaster. The central controller 105 identifies the broadcast station or broadcast stations 110A-110E which is nearest the natural disaster. In this case, broadcast station 110E is closest to the natural disaster. The central controller 105 then inserts the emergency flag and emergency information within the Future Extension Frame of the DVB-T2 stream broadcast from the broadcast station 110E. As noted above, the relaying device 210A located in the vicinity of broadcast station 110E then operates in emergency mode which will be described later in relation to FIG. 7.

In an example scenario, in order to inform the user of the mobile terminal 400A that an emergency situation exists in their location, the emergency services identify from the cellular network companies which mobile telephone cells are affected by the natural disaster. The emergency services generate an SMS telling users within the affected area that an emergency situation exists in their location (step 620). This generated SMS is broadcast using the Short Message Service—Cell Broadcast (SMS-CB) procedure an SMS message to all mobile devices located within the affected cells. This is step 625.

The SMS messaging service is quite robust to network overload. In other words, although voice traffic or internet traffic may not be allowed over the cellular network due to network overload, SMS messages are typically still received. This is because SMS messages are transmitted on network control signals between the mobile terminal and the base station as would be appreciated by the skilled person. Therefore, by sending a warning to a user that an emergency situation exists using SMS-CB, it is possible to reliably warn people located in a specific area that an emergency exists.

Figure 8A:
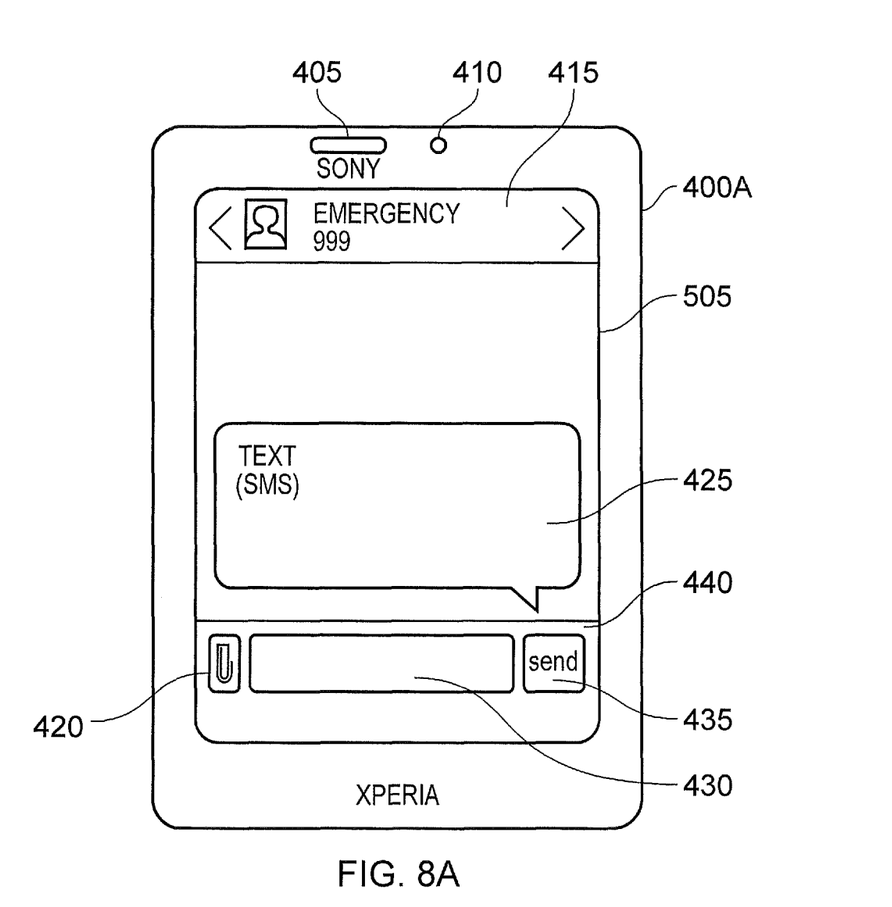
FIG. 8A shows a mobile terminal of FIG. 5 receiving a Short Message Service (SMS) message.

FIG. 8 shows a non-limiting SMS message received on mobile terminal 400A. In a non-limiting example, the mobile terminal 400A is a Sony® Xperia T® mobile telephone running the Android Operating System. As noted with reference to FIG. 5, the mobile terminal 400A includes a speaker 405 and a camera 415. The display 505 receives the SMS from "EMERGENCY", which quickly indicates to the recipient that they need to read the SMS message. This is indicated in area 415 of the display 505. The text box 425 displays the text of the generated emergency message broadcast using SMS-CB. For example, the emergency message may read "An emergency exists in your location. Please connect to the nearest WiFi hotspot called "EMERGENCY" for more information. Message ends". As the limit for a single SMS message is 160 characters, it is useful that the emergency message has no more than 160 characters so only one SMS message is sent to each mobile terminal 400A.

Area 440 on the display 505 is a user interaction area. In this area, attachment button 420 is provided. By pressing this button, the user is prompted to attach one or more files to an SMS message. In this non-limiting example, if the user presses the attachment button 420, the user is prompted to attach a photograph to a reply to the emergency SMS message. This allows a user to provide a real time photographic update of the scene to the emergency services. Of course, if the network is overloaded, this feature may be disabled by the emergency services or the cellular network operator. In other embodiments images can be uploaded via the WiFi or Wimax network to server to which emergency services have access. If a back channel to the internet or emergency services is unavailable, data may be cached on a data storage at the relay station and then transmitted at a later time for example when a connected has been restored or has bandwidth available.

Alternatively, if the network is overloaded, the mobile operator may push a read only SMS message to the mobile terminals. This is known in the field of roaming, where a welcome message from host operator is provided with tariff information.

In addition, typing area 430 allows a user to type a message which will be relayed to the emergency services in reply to the emergency SMS message. When the user presses the typing area 430, a keyboard is displayed on the display 505. This allows the user to enter a short message for the emergency services. As noted above, as SMS messages use network signals to communicate, providing the ability to reply to the text message gives the emergency services the opportunity to have real-time updates from the user, without increasing the data traffic on the overloaded network.

The send button 435 allows a user to send a message to the emergency services using the SMS messaging service.

Referring back to FIG. 6, after the SMS message is sent to the mobile terminal 400A located in a particular cell, and the emergency information is detected in the Future Frame Extension of the DVB-T2 stream, the relay device 210A is switched into emergency mode (step 635). This is described with reference to FIG. 7.

Once the emergency is finished, the emergency flag and emergency information is removed from the Future Extension Frame of the DVB-T2 super frame (step 640). The broadcast station 110E then reverts to operating in the non-emergency mode (step 610).

Obviously, although the flow chart of FIG. 6 has been explained in one particular order, the disclosure is not so limited. For example, steps 630 and 635 may take place before or in parallel with steps 620 and 625. In other words, the emergency information may be broadcast by the broadcast station before or at the same time as the SMS message is transmitted.

Figure 7:
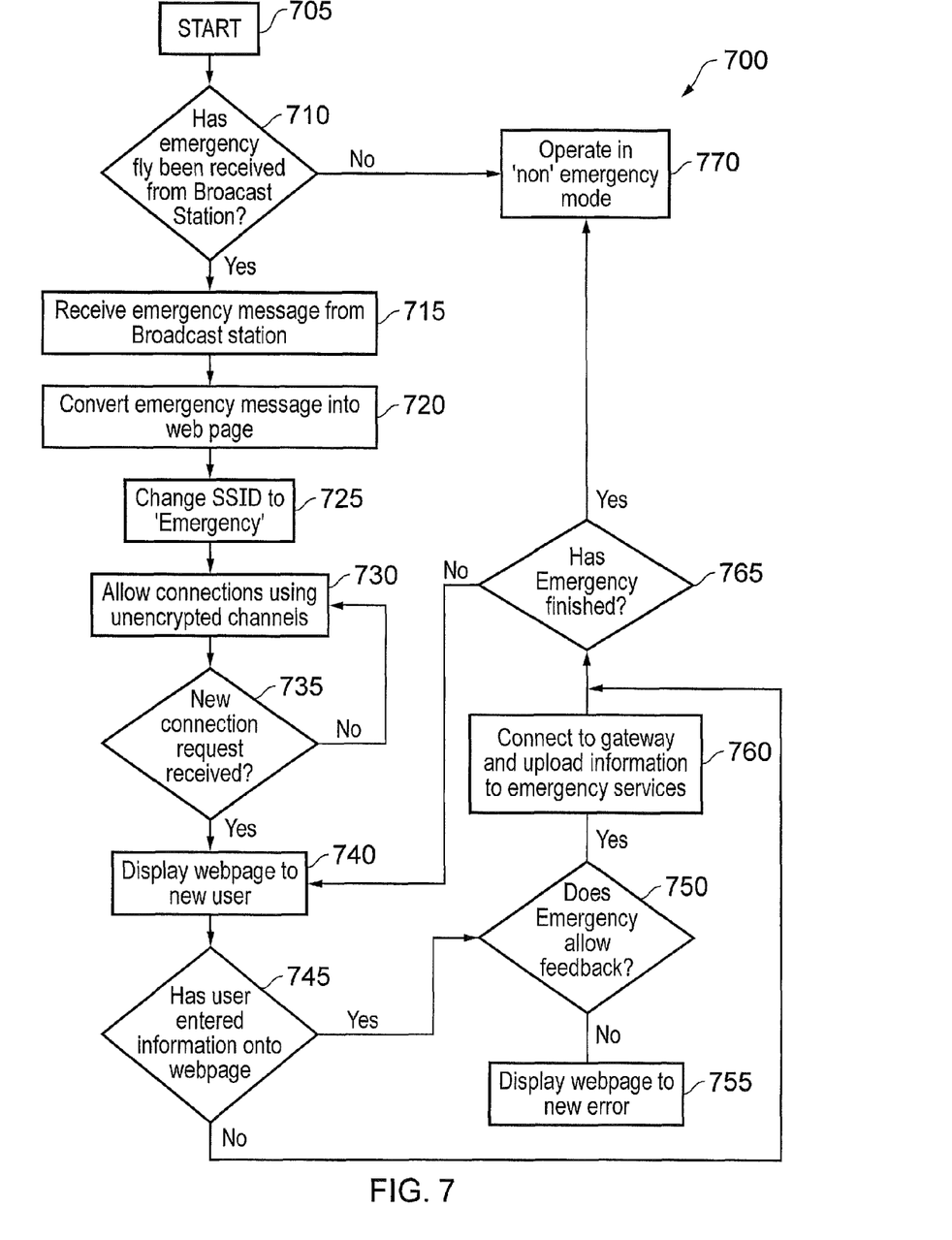
FIG. 7 shows a flow diagram explaining the interaction of the relay device and mobile terminal according to the disclosure.

FIG. 7 shows a flow chart describing the process of operating the relay device 210A in an emergency mode. The process starts at step 705. At step 710, the first processor 600 within the routing device 210A determines whether the emergency flag and/or emergency information are located within the Future Extension Frame of the DVB-T2 super frame. In the event of no emergency flag and/or emergency information located within the Future Extension Frame of the DVB-T2, the "no" path is followed and the routing device 210A operates in a non-emergency mode (step 770). In other words, the routing device 210A operates as a conventional WiFi hotspot.

However, in the event that the routing device 210A detects either the emergency flag or the emergency information in the Future Extension Frame of the DVB-T2 stream, the "yes" path is followed and the processor 600 of the routing device 210A extracts the emergency information from the Future Extension Frame of the DVB-T2 stream in step 715. The emergency information may include text data. This text data may include details of the emergency, meeting points, points of safety, travel information, what a user of the mobile terminal 400A should do to protect themselves or the like.

In order to reduce the amount of data transmitted to the routing device 210A, however, the emergency information may include the Unique Resource Identifier (URI) of a webpage which contains all this information. In this example though, the emergency information includes text data. This is because if the emergency information contained a URI, the routing device 210A would need to be connected to an operation network in order to access the Internet. This may not be appropriate in an emergency situation.

Therefore, where the emergency information is contains the text received from the broadcast station, and the routing device 210A creates the webpage from the received emergency information, it is irrelevant whether the routing device 210A can connect to the Internet. In such a case the WiFi hotspot may operate as a self-contained server for a local network. The emergency information text data is converted by the first processor 600 into a webpage (step 720) and store the webpage within the memory in the routing device 210A. The details of the webpage will be described later.

In example embodiments, after conversion of the text data into a webpage, the first processor 600 changes the Service Set Identifier (SSID) of the routing device 210A to for example, "Emergency" (step 725). By changing the SSID of each routing device 210A-210E to "Emergency", the user of the mobile terminal 400A will immediately know which routing device can provide the emergency information. Also, as users move around the locality, the mobile terminal 400A will connect to different routing devices with the same SSID.

The first processor 600 controls the WiFi transceiver 620 to allow all requesting devices, such as the mobile terminal 400A, to connect to the routing device 210A over an unencrypted channel (step 730). The communication channel may be unencrypted such that members of the public can easily connect to it, or it may be encrypted for particular use by emergency services. Both scenarios may co-exist. Some encrypted data may be transmitted over the unencrypted channel. Terminals operated by the emergency services may be provided with appropriate data for connecting to an encrypted communication channel. At step 735 the first processor 600 decides if a new connection request from a mobile terminal is received. If no new connection request is received, the "no" path is followed and the first processor 600 waits for a new connection request to be received.

Once a new connection request is received, the "yes" path is followed. A webpage containing the emergency information is passed to the mobile terminal 400A over WiFi. In other words, the mobile terminal 400A receives the emergency information using a different mechanism which reduces the cellular network capacity.

Figure 8B:
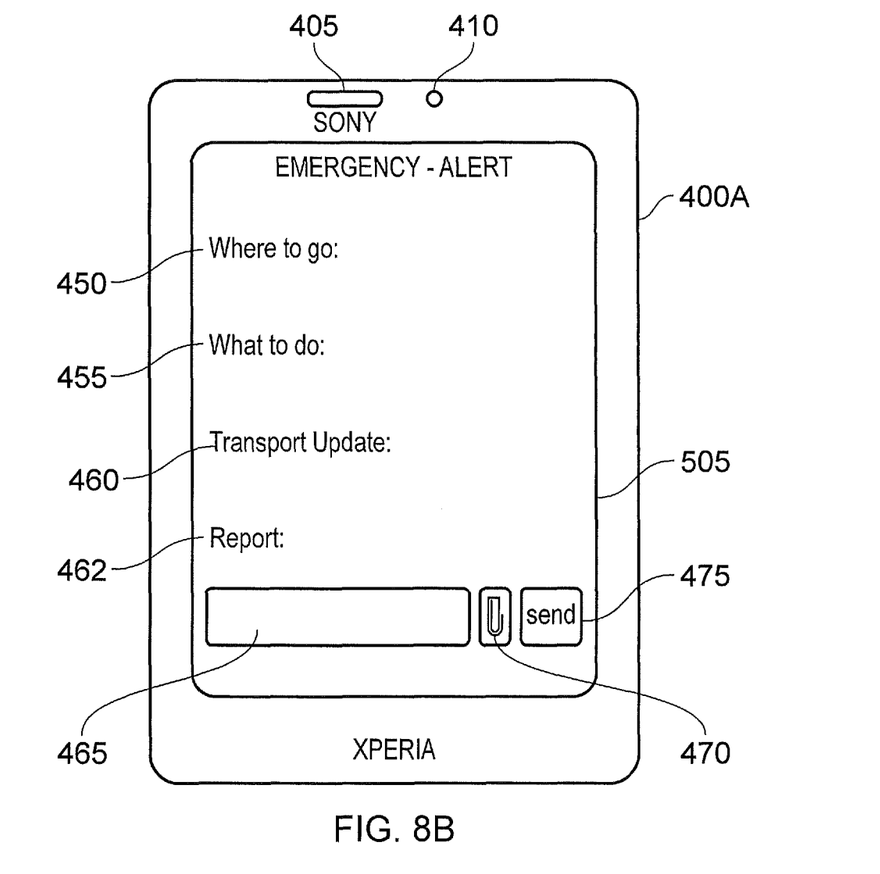
FIG. 8B shows a mobile terminal of FIG. 5 connected to a webpage via the relay device of FIG. 4.

The routing device 210A sends the webpage created in step 720 to the newly connected mobile terminal 400A. The mobile terminal 400A then displays the webpage to the user in step 740. A non-limiting example of the webpage is shown in FIG. 8B. Similar to FIG. 8A, the mobile terminal 400A in FIG. 8B is a Sony® Xperia T® cellular telephone. Like reference numerals in FIG. 8B refer to like features in FIG. 8A.

On the webpage, there may be provided headings such as "Where to Go" 450, "What to Do" 455 and "Transport Update" 460. These example headings allow the user to read the information quickly, thus assisting the user in remaining safe. As will be explained later, the webpage, in certain circumstances, also provides the user the provide feedback to the emergency services under the "Report" heading 462. The feedback is provided by the text box 465 which allows a user to enter text to send to the emergency services, an attachment button 470 which allows a user to attach a file, such as a photograph, to send to the emergency services and a send button 475 that sends the text and any attachment to the emergency services using the routing device 210A.

In order to provide the webpage to the mobile terminal 400A, the routing device 210A uses a captive portal. With this technique, when the mobile terminal 400A connects to the routing device 210A and the user opens a web browser within the mobile terminal 400A, the mobile terminal 400A will try to access the internet to take the user to their "Home Page". However, as the routing device 210A operates as a captive portal, the routing device 210A will instead direct the user to a specific webpage. In the afore example, where the routing device 210A constructs the webpage using the emergency information received from the broadcast station 110E, the webpage to which the mobile terminal 400A is re-directed will be stored locally within the memory of the routing device 210A. Alternatively, if the emergency information contains a URI of a webpage to which the browser of the mobile terminal 400A will be directed, the routing device 210A will allow the browser in the mobile terminal 400A to access this webpage. However, in this case, only the URI of the webpage containing the emergency service information will be the only page whitelisted to prevent the user of the mobile terminal 400A from accessing other web services which would reduce the capacity of other users to connect to the routing device 210A.

Returning to FIG. 7, if the user enters information under the "Report" heading such as text information describing the situation in their location in text box 465 or an attachment (such as a photograph of the scene captured using camera 410) using attachment button 470 and presses the send button 475, the routing device 210A will detect this request from the mobile terminal 400A. This is step 745. The user may need to identify themselves via a cellular phone number, email address or an identifier of their handset or other computing device.

If the user of the mobile terminal 400A does enter information under the "Report" heading in step 745, the "yes" path is followed. The routing device 210A then has to determine whether the emergency services have permitted feedback to be provided (step 750). In order to determine whether feedback is permitted, a feedback flag is included in the Future Extension Frame of the DVB-T2 stream. The presence of this flag indicates that feedback is permitted. In the event that the feedback flag is either missing or indicates that feedback is not permitted, the "no" path is followed and a second webpage indicating an error is displayed on the mobile terminal 400A. This is step 755.

Alternatively, if feedback is permitted, the "yes" path is followed. In this case, the routing device 210A connects to the internet gateway allowing the feedback information to be uploaded to a particular server or webpage hosted by the emergency services. This is step 760. Along with the feedback information from the user of the mobile terminal 400A, the location of the routing device 210A is also provided. This allows the emergency services to determine an approximate location of the user of the mobile terminal 400A. Of course, when the mobile terminal 400A provides the feedback information, the mobile terminal 400A may also provide the location of the mobile terminal 400A if a Global Positioning System (GPS) service is enabled on the mobile terminal 400A (not shown). This will be uploaded by the routing device 210A to the emergency services when the feedback is uploaded. In some instances, a webpage with feedback box is served if there is an active back channel available. However, if it is detected that the back channel is not available, a different webpage without feedback text box is served.

The routing device 210A then determines whether the emergency is still on-going at step 765. The routing device 210A determines this from the presence of the emergency information within the Future Extension Frame within the DVB-T2 stream. In other words, if the emergency information is present in the Future Extension Frame, the emergency is deemed on-going. In the event that there is the presence of emergency information, the "no" step is followed and a webpage corresponding to the emergency information is displayed on the mobile terminal (step 740). Alternatively, if there is no emergency information, the emergency is finished and the "yes" path is followed. In this case, the routing device 210A returns to operating in a non-emergency mode. In other words, the routing device 210A returns to operating as a conventional WiFi hotspot.

Although the foregoing has described the routing device 110A as a WiFi hotspot, the disclosure is not so limited. The routing device 110A may be a cellular network base-station, an internet enabled television (having a DVB-T2 receiver as standard) or other consumer product, a laptop computer or other mobile terminal which has the capability of operating as a WiFi hotspot or the like.

Indeed, the mobile terminal 400A may also itself operate as a WiFi hotspot and thus once the webpage is received from the routing device 210A, the mobile terminal 400A may become a WiFi hotspot to which other mobile terminals can connect. This would increase the speed of dissemination of the webpage to numerous mobile terminals with a limited number of routing devices 210A.

Although the foregoing has been described with reference to DVB-T2, any kind of broadcast signal is envisaged. This may be digital or indeed analogue. For example, the use of FM radio and/or accompanying RDS information is envisaged as well as so-called shortwave radio, which has a very long range and so thus requires few broadcast stations. Shortwave radio may be useful in national emergencies that impact a whole country where broadcast stations 110A-110E are affected.

Although the foregoing has described the textbox being included in all webpages and the routing device 210A determining whether the user has entered text into the text box, the disclosure is not so limited. Indeed, where no feedback from the user is permitted, the webpage to which the mobile terminal 400A is directed may not include the relevant computer code (either HTML or HTML5) when feedback is not permitted. In the situation where the first processor 600 within the routing device 210A generates the webpage, the emergency information may not include the text box code or the feedback flag may determine whether or not predefined computer code for the text box stored within the memory of the routing device 210A is inserted in the created webpage which is to be displayed on the mobile terminal 400A.

Obviously, numerous modifications and variations of the present disclosure are possible in light of the above teachings. It is therefore to be understood that within the scope of the appended claims, the invention may be practiced otherwise than as specifically described herein.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention.

The invention claimed is:

1. A relay device configured to relay emergency information to a plurality of mobile terminals, the relay device comprising:
  circuitry configured to:
    relay bidirectional communication in a non-emergency mode, the bidirectional communication being in a first format;
    receive a broadcast signal that is in a second format and includes the emergency information;
    change an operation mode of the relay device from the non-emergency mode to an emergency mode, in response to an emergency flag being carried in the received broadcast signal, the emergency mode being different than the non-emergency mode;
    broadcast a predetermined identifier to the plurality of mobile terminals when the operation mode of the relay device is in the emergency mode, the predetermined identifier identifying the relay device; and
    provide the emergency information, received in the broadcast signal in the second format, to the plurality of mobile terminals via communication in the first format when the operation mode of the relay device is in the emergency mode, wherein the second format is an Advanced Television Systems Committee (ATSC) digital terrestrial television standard, and
the second format is different from the first format.

2. The relay device according to claim 1, wherein the circuitry is further configured to connect to the plurality of mobile terminals using a communication channel, the communication channel being unencrypted.

3. The relay device according to claim 1, wherein the emergency information includes text of a webpage to be displayed on the plurality of mobile terminals, and the circuitry is configured to convert the received text into the webpage to be displayed on the plurality of mobile terminals.

4. The relay device according to claim 3, wherein the circuitry is further configured to include a feedback element within the webpage in response to receiving a feedback flag located in the received broadcast signal.

5. The relay device according to claim 1, wherein the circuitry is further configured to:
  connect to a network, wherein the emergency information includes a unique resource identifier of a webpage to be displayed to the plurality of mobile terminals; and
  provide the webpage at the unique resource identifier to the plurality of mobile terminals.

6. The relay device according to claim 1, wherein the relay device is utilized as a WiFi hotspot, and the predetermined identifier is a Service Set Identifier (SSID).

7. A system, comprising:
  a mobile terminal having circuitry configured to connect to the relay device of claim 1 over a communication channel and to receive the emergency information in the first format.

8. The system of claim 7, wherein the circuitry of the mobile terminal is further configured to connect to a cellular network, wherein prior to connection to the relay device, the circuitry of the mobile terminal is configured to receive a message over the cellular network, the message being sent using Short Message Service-Cell Broadcast.

9. The relay device according to claim 1, wherein the circuitry is configured to connect to a mobile terminal from among the plurality of mobile terminals via WiFi.

10. The relay device according to claim 1, wherein
  the emergency mode is used during an emergency situation, and
  the non-emergency mode is used during a non-emergency situation.

11. The relay device according to claim 10, wherein the emergency situation is a natural disaster.

12. The relay device according to claim 1, wherein the predetermined identifier broadcasted in the emergency mode is different than the predetermined identifier broadcasted in the non-emergency mode.

13. The relay device according to claim 1, wherein the second format is configurable to use one of a number of forward error correction (FEC) modes and the broadcast signal received decodes a signal using an FEC mode which is more robust to transmission errors than another of the number of FEC modes.

14. The relay device according to claim 1, wherein
  the first format is 3rd Generation Partnership Project (3GPP) communication standard, and
  the communication in the first format to provide the emergency information that is at least in part a short message service (SMS) message.

15. The relay device according to claim 1, wherein
the first format is 3rd Generation Partnership Project (3GPP) communication standard, and
the communication in the first format to provide the emergency information that is at least in part is a multi-media service (MMS) message.

16. The relay device according to claim 1, wherein the communication in the first format to provide the emergency information via a webpage sent over wifi.

17. A method of relaying emergency information to a plurality of mobile terminals, the method comprising:
relaying, by circuitry of a relay device, bidirectional communication in a non-emergency mode, the bidirectional communication being in a first format;
receiving, by the circuitry, a broadcast signal that is in a second format and includes the emergency information;
changing, by the circuitry, an operation mode of the relay device from the non-emergency mode to an emergency mode, in response to an emergency flag being carried in the received broadcast signal, the emergency mode being different than the non-emergency mode;
broadcasting, by the circuitry, a predetermined identifier to the plurality of mobile terminals when the operation mode of the relay device is in the emergency mode, the predetermined identifier identifying the relay device; and
providing, by the circuitry of the relay device, the emergency information, received in the broadcast signal in the second format to the plurality of mobile terminals via communication in the first format when the operation mode of the relay device is in the emergency mode, wherein
the second format is an Advanced Television Systems Committee (ATSC) digital terrestrial television standard, and
the second format is different from the first format.

18. The method according to claim 17, further comprising:
connecting, by the circuitry of the relay device, to the plurality of mobile terminals using a communication channel, wherein the communication channel is unencrypted.

19. The method according to claim 17, wherein the emergency information includes text of a webpage to be displayed on the plurality of mobile terminals, and the method further comprises converting the received text into the webpage to be displayed on the plurality of mobile terminals.

20. The method according to claim 19, further comprising:
including a feedback element within the webpage in response to receiving a feedback flag located in the received broadcast signal.

21. The method according to claim 17, further comprising:
connecting to a network, wherein the emergency information includes a unique resource identifier of a webpage to be displayed to the plurality of mobile terminals; and
providing the webpage at the unique resource identifier to the plurality of mobile terminals.

22. A non-transitory computer readable medium including computer program instructions, which when executed by a relay device, cause the relay device to perform a method, the method comprising:
relaying bidirectional communication in a non-emergency mode, the bidirectional communication being in a first format;
receiving a broadcast signal that is in a second format and includes the emergency information;
changing an operation mode of the relay device from the non-emergency mode to an emergency mode, in response to an emergency flag being carried in the received broadcast signal, the emergency mode being different than the non-emergency mode;
broadcasting a predetermined identifier to the plurality of mobile terminals when the operation mode of the relay device is in the emergency mode, the predetermined identifier identifying the relay device; and
providing the emergency information, received in the broadcast signal in the second format, to the plurality of mobile terminals via communication in the first format when the operation mode of the relay device is in the emergency mode, wherein
the second format is an Advanced Television Systems Committee (ATSC) digital terrestrial television standard, and
the second format is different from the first format.

* * * * *